Patented June 12, 1934

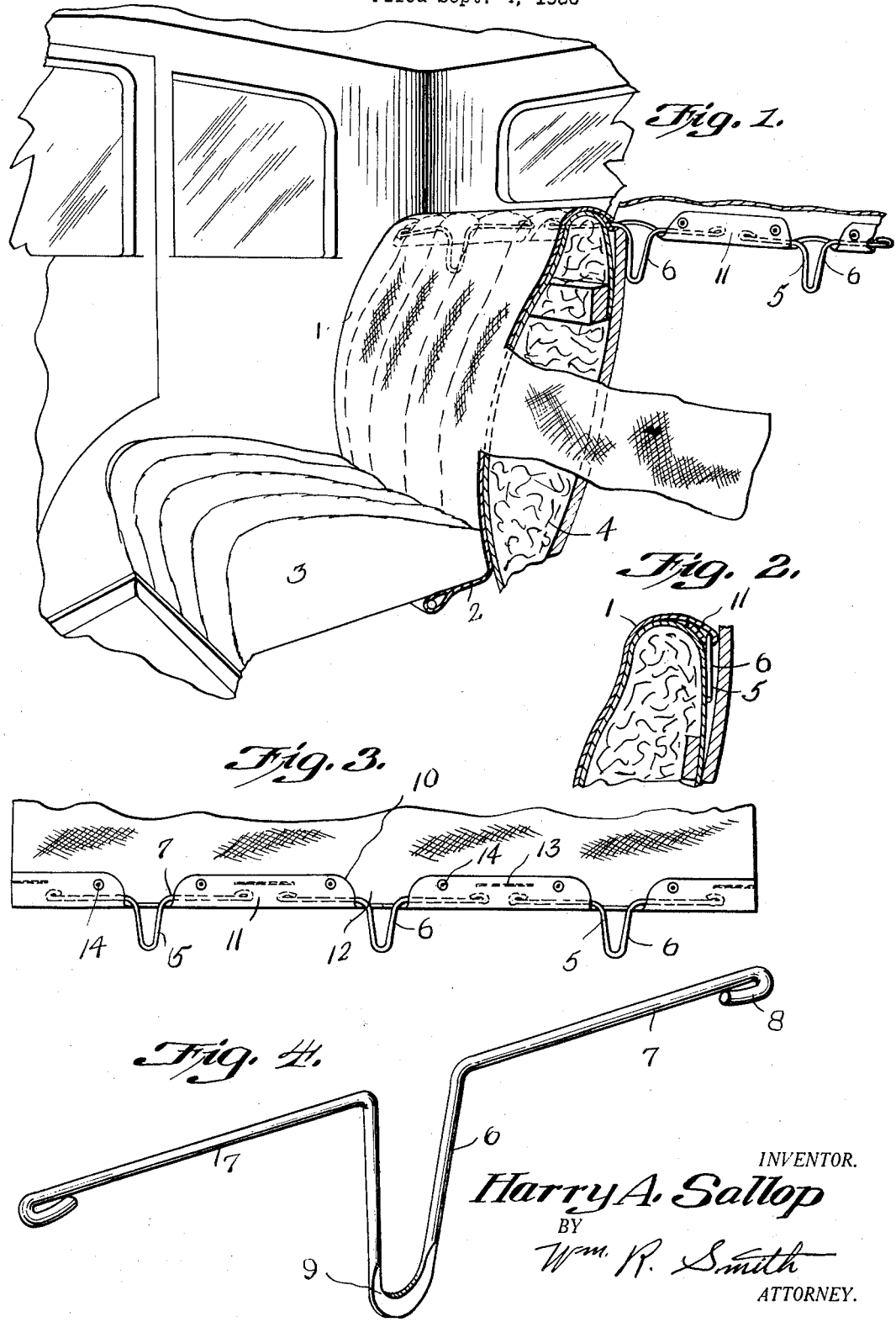

1,962,215

UNITED STATES PATENT OFFICE 1,962,215

AUTOMOBILE SEAT COVER

Harry A. Sallop, New York, N. Y., assignor to Evr-Klean Seat Pad Company, St. Louis, Mo., a corporation of Missouri Application September 4, 1930, Serial No. 479,612

1 Claim. (Cl. 155—182)

This invention relates to an automobile seat cover and has for its primary objects a design of seat cover incorporating a unique type of fastener means whereby the cover may be more effectively secured to the types of seat structures now in use and which may be accomplished economically.

An object of the invention resides in the novel manner of constructing and associating the various fastener devices so that each device may be individually inserted in place thereby enabling a more effective connection of the cover section to the seat structure.

Another object of the invention resides in the unique design of the individual fastener devices and their mode of connection to the cover so that the same may be readily connected to or disconnected from the cover section when found necessary such as when occasion arises to wash the cover section.

A feature of my invention resides in the simple and inexpensive manner in which the cover section is provided with an extension for engagement under the seat cushion and a plurality of flaps that are detachably connected to a plurality of fasteners of a unique design.

Besides the above my invention is distinguished in constructing a fastener bar for the upper portion of the cover section of a plurality of individual fastener devices or sections each capable of independent movement into locking position with the seat structure and further capable of independent disconnection from the seat structure.

With these and other objects in view the invention will be better understood from the following detailed description taken in connection with the accompanying drawing wherein—

Figure 1 is a fragmentary sectional view of the seat cover.

Figure 2 is a detailed sectional view.

Figure 3 is a fragmentary view of the upper portion of the seat cover.

Figure 4 is a perspective view of one of the fastener devices.

Again referring to the drawing illustrating one of the many constructions of my invention, the numeral 1 designates the cover section designed to provide an extension 2 capable of being positioned under the cushion 3 of the seat so as to prevent rising of the cover section and besides effectively hold the fastening means in proper engagement with the upper portion of the seat back 4.

A very important feature of my invention resides in the unique design of fastening means utilized. The means illustrated consist of a plurality of fastener devices 5 each separately formed from a length of wire bent to provide an intermediate prong 6 and shanks 7 terminating in loops 8. I have found it to advantage to flatten a part of the prong preferably the yoke to provide a penetrating head 9 for facilitating the insertion of the prong behind the seat back 4. The various fastener devices are supported in alignment with each other in a disconnected relation by an edge portion of the cover section so that each individual device may be individually manipulated in the attaching of the cover to the seat structure. This arrangement also facilitates the positioning of the upper portion of the seat cover over the seat back.

To enable the quick removal of the fastener device from the cover section such as when it is found necessary to wash the cover section I have designed the hem 10 of the cover section that carries the fastener means in a unique manner to provide a plurality of flaps 11 which are arranged in spaced relation to provide openings 12. The flaps are adapted to removably receive the shanks 7 of the fastening devices with the prongs 6 extending through the openings 12. To facilitate the insertion of the shanks behind the flaps, the latter has an intermediate portion firmly secured to the cover section by the stitching 13 with the end portions of the flaps removably connected to the cover section by the securing elements illustrated as snap fasteners 14. It will be appreciated that by disconnecting the snap fasteners 14 the shanks of the fastening devices may be readily disconnected from the flaps.

Due to the fact that the shanks of the fastener devices are all arranged in alignment with the prongs also arranged in alignment I have obtained the advantage of a rod construction for securing the upper edge portion of the cover section to the seat structure with the additional advantage of individual insertion of the fastening devices in place or the individual removal. This construction also enables a more readily folding of the seat cover for shipping purposes.

Of course it is to be understood that the design of the individual fasteners may be changed in various ways and they may be connected to the cover section in other manners than illustrated therefore I do not desire to be limited in protection in any manner whatsoever except as set forth in the following claim.

What I claim is:

An automobile seat cover comprising a cover section, a plurality of flaps extending along one edge portion of the cover section, means for permanently attaching portions of the flaps to the cover section, means for detachably connecting other portions of the flaps to the cover section and fasteners removably supported by said flaps.

HARRY A. SALLOP.